(12) United States Patent
Kim et al.

(10) Patent No.: US 10,503,045 B2
(45) Date of Patent: Dec. 10, 2019

(54) BEAM STEERING APPARATUS, METHOD OF DRIVING THE BEAM STEERING APPARATUS, AND SPATIAL INFORMATION ACQUISITION APPARATUS USING THE BEAM STEERING APPARATUS

(71) Applicant: SAMSUNG ELECTRONICS CO., LTD., Suwon-si (KR)

(72) Inventors: Jinmyoung Kim, Suwon-si (KR); Jaehyuk Choi, Suwon-si (KR); Jungwoo Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 463 days.

(21) Appl. No.: 15/371,326

(22) Filed: Dec. 7, 2016

(65) Prior Publication Data

US 2017/0168373 A1    Jun. 15, 2017

(30) Foreign Application Priority Data

Dec. 11, 2015 (KR) .......................... 10-2015-0177364

(51) Int. Cl.
*G01C 3/08* (2006.01)
*G02F 1/29* (2006.01)
*G01S 7/481* (2006.01)
*G01S 17/08* (2006.01)

(52) U.S. Cl.
CPC ............ *G02F 1/292* (2013.01); *G01S 7/4814* (2013.01); *G01S 17/08* (2013.01); *G02F 2203/24* (2013.01)

(58) Field of Classification Search
CPC .... G02F 2203/24; G02F 1/292; G01S 7/4814; G01S 17/08

USPC .......................................................... 356/4.01
See application file for complete search history.

(56) References Cited

U.S. PATENT DOCUMENTS

| | | | |
|---|---|---|---|
| 4,386,827 A | 6/1983 | Scifres et al. | |
| 4,937,539 A * | 6/1990 | Grinberg | G02B 27/0087 349/202 |
| 5,151,814 A | 9/1992 | Grinberg et al. | |
| 5,943,159 A * | 8/1999 | Zhu | G02F 1/292 359/254 |
| 7,109,918 B1 | 9/2006 | Meadows et al. | |
| 7,616,787 B2 | 11/2009 | Boshra | |

(Continued)

FOREIGN PATENT DOCUMENTS

WO    2015/019551 A1    2/2015

OTHER PUBLICATIONS

Communication dated May 15, 2017, from the European Patent Office in counterpart European Application No. 16203410.2.

*Primary Examiner* — Mark Hellner
(74) *Attorney, Agent, or Firm* — Sughrue Mion, PLLC

(57) ABSTRACT

A beam steering apparatus, a method of driving the beam steering apparatus, and a spatial information acquisition apparatus using the beam steering apparatus, are provided. The beam steering apparatus includes a light source, and a steering array including elements having refractive indexes varying with a voltage driving the steering array, the elements being configured to control a direction of a beam from the light source and incident on the steering array. The beam steering apparatus further includes a driver configured to generate the voltage, based on an intermediate value of at least two voltages, and drive the steering array, based on the generated voltage.

17 Claims, 19 Drawing Sheets

(56) References Cited

U.S. PATENT DOCUMENTS

| | | | |
|---|---|---|---|
| 7,907,331 B2* | 3/2011 | Maram | G02B 26/0808 |
| | | | 349/201 |
| 7,994,460 B2 | 8/2011 | Steinkraus, Jr. et al. | |
| 2005/0199731 A9 | 9/2005 | Empedocles et al. | |
| 2006/0239312 A1 | 10/2006 | Kewitsch et al. | |
| 2013/0100108 A1 | 4/2013 | Chiang et al. | |
| 2015/0036057 A1 | 2/2015 | Richards | |

* cited by examiner

FIG. 7B

|  | First Super-cell | Second Super-cell | Third Super-cell | Fourth Super-cell |  |
|---|---|---|---|---|---|
| operation 1. Sampling (from DAC) | V1 ... V1 | V1 ... V1 | V2 ... V2 | V2 ... V2 | V2 ... V2 |
| operation 2. Mid-level generation | V1 ... V1 | $\frac{V1+V2}{2}$ ... $\frac{V1+V2}{2}$ | $\frac{V1+V2}{2}$ ... V2 | V2 ... V2 | V2 ... V2 |
| operation 3. Quater-level generation | V1 ... V1 | $\frac{3V1+V2}{4}$ ... $\frac{V1+V2}{2}$ | $\frac{V1+V2}{2}$ ... $\frac{V1+3V2}{4}$ | $\frac{V1+3V2}{4}$ ... V2 | V2 ... $\frac{V1+3V2}{4}$ |

BEAM STEERING APPARATUS, METHOD OF DRIVING THE BEAM STEERING APPARATUS, AND SPATIAL INFORMATION ACQUISITION APPARATUS USING THE BEAM STEERING APPARATUS

CROSS-REFERENCE TO RELATED APPLICATION

This application claims priority from Korean Patent Application No. 10-2015-0177364, filed on Dec. 11, 2015, in the Korean Intellectual Property Office, the disclosure of which is incorporated herein by reference in its entirety.

BACKGROUND

1. Field

Apparatuses and methods consistent with example embodiments relate to a beam steering apparatus, a method of driving the beam steering apparatus, and a spatial information acquisition apparatus using the beam steering apparatus.

2. Description of the Related Art

A technique of obtaining spatial information by measuring a distance by using light or by scanning an object is, for example, a light detection and ranging (LiDAR) technique. There is a mechanical method and a non-mechanical method of controlling a direction of a beam incident from a light source in the LiDAR. A mechanical beam steering method rotates some machine parts, using a motor to control a direction of a beam. A non-mechanical beam steering method is, for example, a method of using a micro-electro mechanical system (MEMS) mirror.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide a beam steering apparatus that may be driven at high speeds with low power consumption, a method of driving the beam steering apparatus, and a spatial information acquisition apparatus using the beam steering apparatus.

According to an aspect of an example embodiment, there is provided a beam steering apparatus including a light source, and a steering array including elements having refractive indexes varying with a voltage driving the steering array, the elements being configured to control a direction of a beam from the light source and incident on the steering array. The beam steering apparatus further includes a driver configured to generate the voltage, based on an intermediate value of at least two voltages, and drive the steering array, based on the generated voltage.

The driver may include a drive array including cells configured to store first voltages that are applied to the respective elements of the steering array, a power supply configured to apply second voltages to be used to generate the first voltages, to the drive array, and a controller configured to control the drive array. Either one or both of the first voltages and the second voltages are generated based on an intermediate value of at least two voltages.

The power supply may be further configured to generate the second voltages, based on an intermediate value of predetermined initial voltages, and based on a number of cells that are included in a line of the drive array and to which the second voltages are applied.

The second voltages applied to the line of the drive array may have a pattern constantly increasing or decreasing in a direction of the line.

The power supply may include initial voltage generators configured to set any one or any combination of the predetermined initial voltages, resistive parts corresponding to the cells included in the line of the drive array, and switches respectively connected to the resistive parts and configured to drive the resistive parts. The power supply may be further configured to generate the second voltages by selectively operating the switches and the initial voltage generators.

The drive array may be configured to generate the first voltages, based on an intermediate value of the second voltages that are stored in adjacent cells included in the drive array, and store the generated first voltages in the adjacent cells.

The drive array may be further configured to store the second voltages in super cells that are formed by connecting, in predetermined units, cells that are perpendicular to a line of the drive array and to which the second voltages are applied, and the controller may be further configured to store the generated first voltages in the drive array by controlling a connection between adjacent super cells among the super cells and a connection between adjacent cells included in the super cells.

Each of the cells may include a capacitor configured to store one of the second voltages or the first voltages, a first switch configured to control one of the second voltages to be stored in the capacitor, and a second switch configured to control a connection between an adjacent capacitor of an adjacent cell included in the drive array and the capacitor. The controller may be further configured to generate one of the first voltages by selectively operating the first switch and the second switch.

The driver may include a power supply configured to generate second voltages, based on an intermediate value of predetermined initial voltages, and apply the generated second voltages to the drive array, a drive array including cells configured to generate first voltages that are applied to the respective elements of the steering array, based on an intermediate value of the applied second voltages, and store the generated first voltages, and a controller configured to control the drive array.

The controller may be further configured to control the applying of the generated second voltages, the generating of the first voltages, the storing of the first voltages, and the driving of the steering array.

According to an aspect of an example embodiment, there is provided a method of driving a beam steering apparatus, the method including generating a voltage, based on an intermediate value of at least two voltages, driving a steering array, based on the generated voltage, and controlling a direction of a beam from a light source and incident on the steering array, by elements of the steering array, the elements having refractive indexes varying with the voltage driving the steering array.

The method may further include generating first voltages that are applied to the respective elements of the steering array, based on second voltages, and storing the first voltages in cells of a drive array, and applying the second voltages to be used to generate the first voltages, to the drive array. Either one or both of the first voltages and the second voltages are generated based on an intermediate value of at least two voltages.

The method may further include generating the second voltages, based on an intermediate value of predetermined initial voltages, and based on a number of cells that are included in a line of the drive array and to which the second voltages are applied.

The second voltages applied to the line of the drive array may have a pattern constantly increasing or decreasing in a direction of the line.

The generating of the second voltages may include generating the second voltages by selectively operating switches and initial voltage generators, the switches may be respectively connected to resistive parts corresponding to the cells included in the arbitrary line of the drive array, the switches driving the resistive parts, and the initial voltage generators may set any one or any combination of the predetermined initial voltages.

The method may further include generating the first voltages, based on an intermediate value of the second voltages that are stored in adjacent cells included in the drive array, and storing the generated first voltages in the adjacent cells.

The generating and storing of the first voltages may include storing the second voltages in super cells that are formed by connecting, in predetermined units, cells that are perpendicular to a line of the drive array and to which the second voltages are applied, and storing the generated first voltages in the drive array by controlling a connection between adjacent super cells among the super cells and a connection between adjacent cells included in the super cells.

The generating of the first voltages may include generating one of the first voltages by selectively operating a first switch and a second switch of one of the cells, the first switch controls one of the second voltages to be stored in a capacitor of one of the cells, and the second switch controls a connection between an adjacent capacitor of an adjacent cell included in the drive array and the capacitor.

The method may further include generating the second voltages, based on an intermediate value of predetermined initial voltages, applying the second voltages, generating the first voltages that are applied to the respective elements of the steering array, based on an intermediate value of the applied second voltages, and storing the generated first voltages.

According to an aspect of an example embodiment, there is provided a spatial information acquisition apparatus including a beam steering apparatus configured to generate a driving voltage, based on an intermediate value of at least two voltages, and control a direction of a beam from a light source and incident on elements of the beam steering apparatus, the elements having refractive indexes varying with the driving voltage. The spatial information acquisition apparatus further includes a detector configured to detect information of a space into which the beam is reflected from the beam steering apparatus, based on information that is received when the beam is reflected.

BRIEF DESCRIPTION OF THE DRAWINGS

The above and/or other aspects will become apparent and more readily appreciated from the following description of example embodiments, taken in conjunction with the accompanying drawings in which:

FIG. 7B is a diagram illustrating a voltage change process when cells of a drive array of a beam steering apparatus are connected to each other, according to an example embodiment;

DETAILED DESCRIPTION

Figure 1:
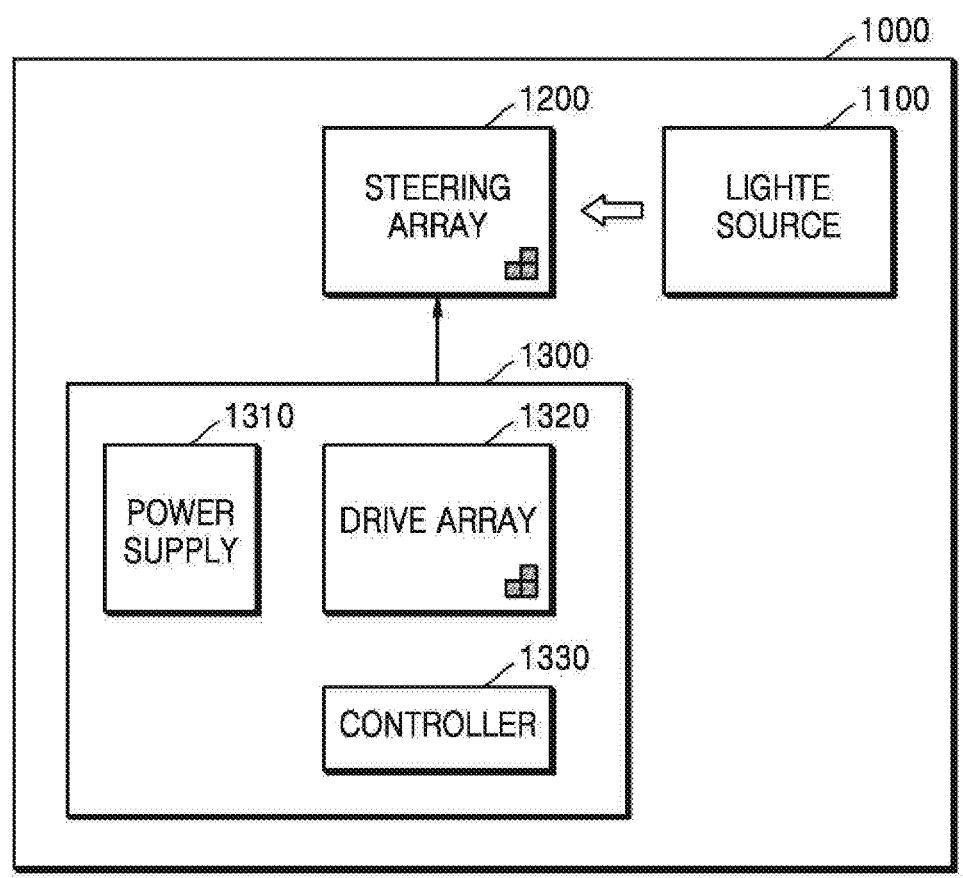
FIG. 1 is a block diagram of a beam steering apparatus according to an example embodiment.

Reference will now be made in detail to example embodiments, examples of which are illustrated in the accompanying drawings, wherein like reference numerals refer to like elements throughout. In this regard, the example embodiments may have different forms and may not be construed as being limited to the descriptions set forth herein. Accordingly, the example embodiments are described below, by referring to the figures, to explain aspects.

It will be understood that the terms 'comprise' and/or 'comprising,' when used in this specification, specify the presence of stated features, integers, steps, operations, elements, and/or components, but do not preclude the presence or addition of one or more other features, integers, steps, operations, elements, components, and/or groups thereof.

It will be further understood that, although the terms 'first', 'second', 'third,' etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

The example embodiments set forth herein are related to a beam steering apparatus, a method of driving the beam steering apparatus, and a spatial information acquisition apparatus using the beam steering apparatus. Matters of these example embodiments that are obvious to those of ordinary skill in the technical field to which these example embodiments pertain may not be described here in detail.

As used herein, the term 'and/or' includes any and all combinations of one or more of the associated listed items. Expressions such as 'at least one of,' when preceding a list of elements, modify the entire list of elements and do not modify the individual elements of the list. In addition, the terms such as "unit," "-er (-or)," and "module" described in the specification refer to an element for performing at least one function or operation, and may be implemented in hardware, software, or the combination of hardware and software.

FIG. 1 is a block diagram of a beam steering apparatus 1000 according to an example embodiment.

Referring to FIG. 1, the beam steering apparatus 1000 may include a light source 1100, a steering array 1200, and a driver 1300. The driver 1300 may include a power supply 1310, a drive array 1320, and a controller 1330. The beam steering apparatus 1000 may radiate a beam generated from the light source 1100 in a desired direction by controlling a direction of the beam.

The light source 1100 may generate and emit a beam. The light source 1100 may include a laser diode (LD), a light-emitting diode (LED), or the like.

The steering array 1200 may control a direction of a beam incident from the light source 1100.

The driver 1300 may drive the steering array 1200. The drive array 1320 may generate and store voltages to be applied to the steering array 1200, and apply the voltages to the steering array 1200 so that the steering array 1200 may control the direction of a beam. The power supply 1310 may apply a voltage to the drive array 1320 to drive the steering array 1200. The controller 1330 may control storing of a voltage to be applied to the drive array 1320, and control generating, storing, and applying of a voltage to be applied from the drive array 1320 to the steering array 1200.

Figure 2:
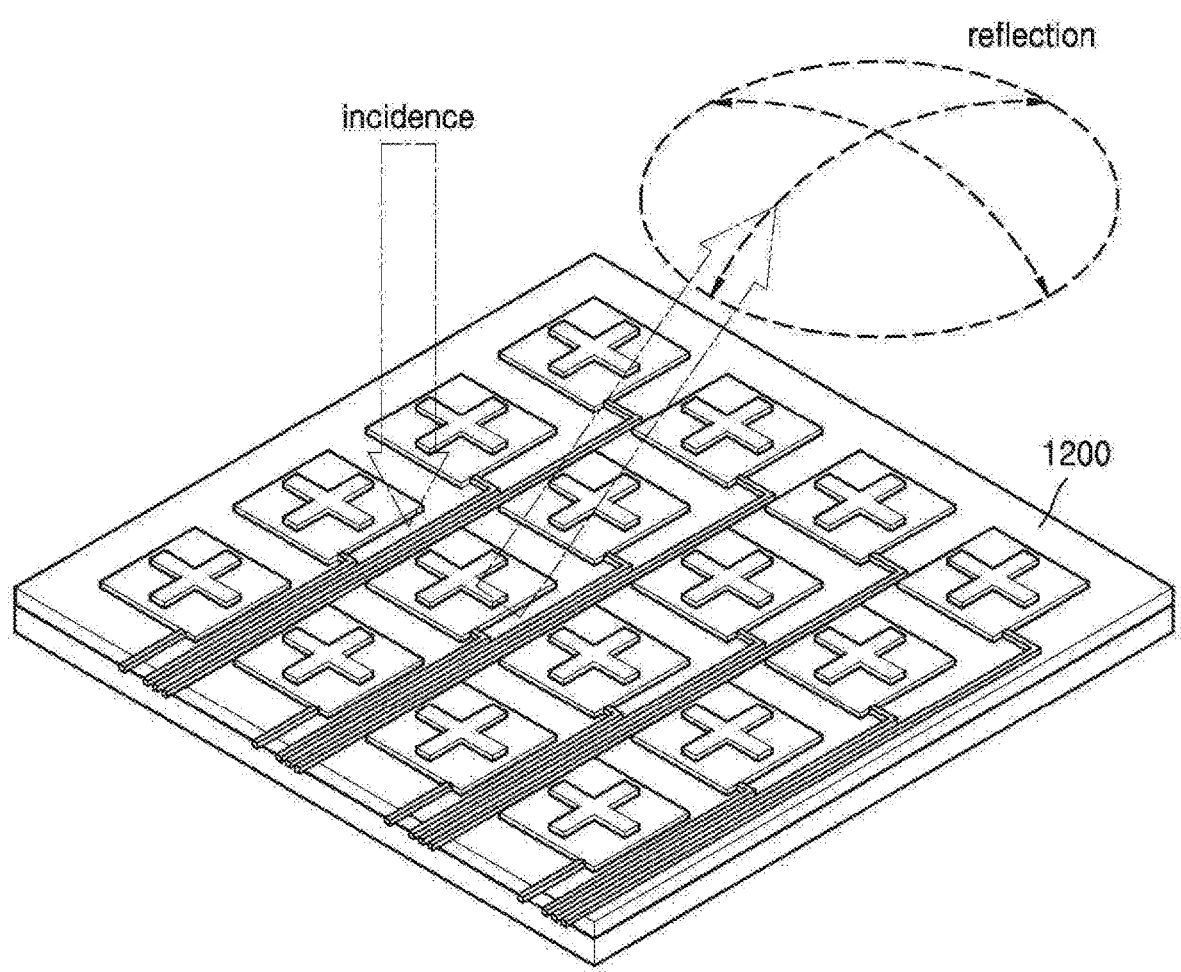
FIG. 2 is a diagram illustrating a process of reflecting a beam incident from a beam steering apparatus, according to an example embodiment.

FIG. 2 is a diagram illustrating a process of reflecting a beam incident from a beam steering apparatus, according to an example embodiment.

Referring to FIG. 2, a beam is incident on a steering array 1200 and reflected from the steering array 1200. A beam reflected from a region of the steering array 1200 may be emitted in the form of a spherical wave. The steering array 1200 may radiate a beam in a direction in which beams emitted from all regions of the steering array 1200 in the form of a spherical wave are focused.

Figure 3:
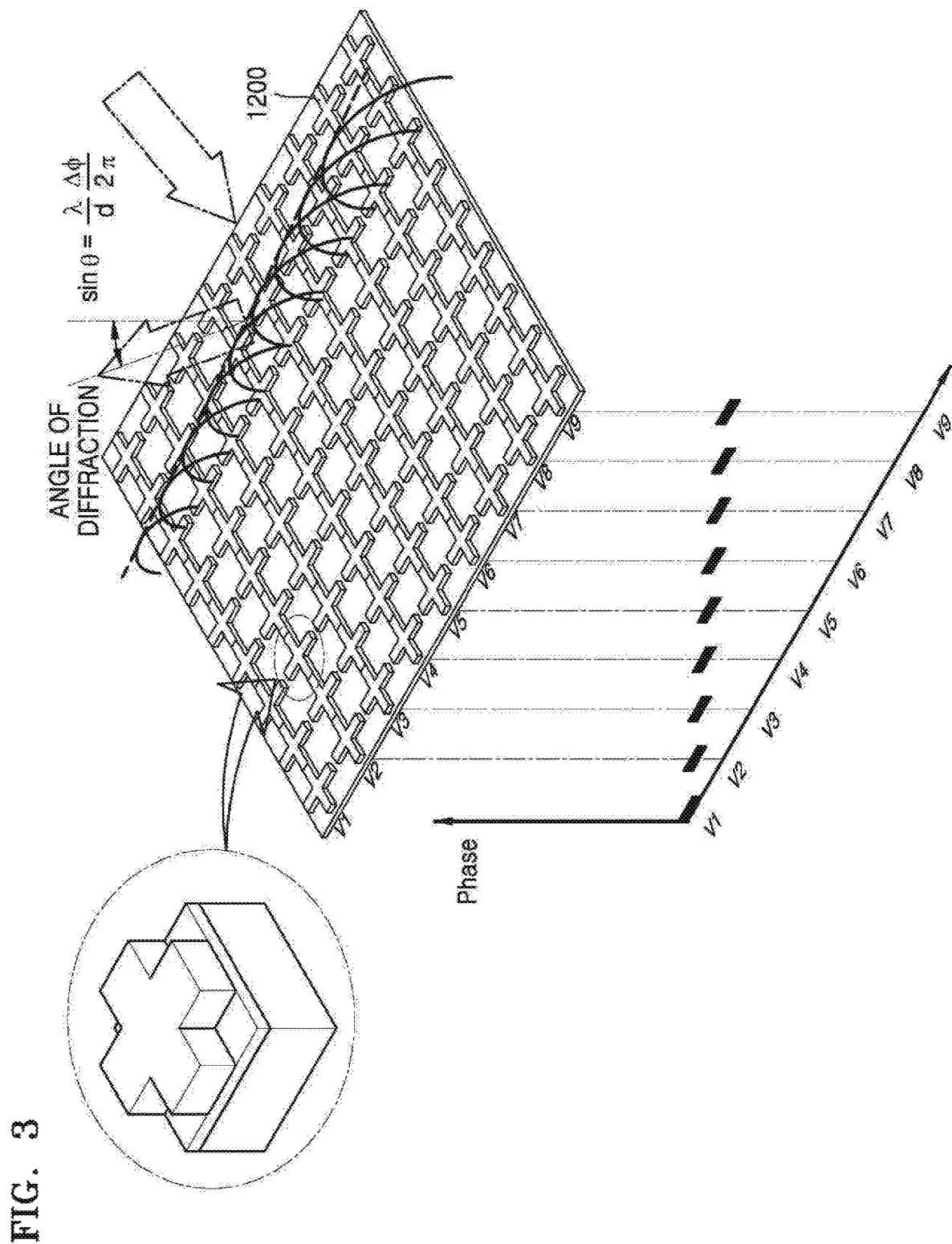
FIG. 3 is a diagram illustrating a structure and operation of a steering array of a beam steering apparatus, according to an example embodiment.

FIG. 3 is a diagram illustrating a structure and operation of the steering array 1200 of a beam steering apparatus, according to an example embodiment.

The steering array 1200 may include a plurality of elements. As illustrated in FIG. 3, the steering array 1200 may be a two-dimensional (2D) array. Different voltages (e.g., V1 to V9) may be respectively applied to elements included in an arbitrary line of the steering array 1200. Beams emitted from the elements of the steering array 1200 may vary according to voltages applied to the elements. Beams emitted from the elements of the steering array 1200 may be focused and radiated at a normal of a 2D plane of the steering array 1200 in a direction of a predetermined angle. An angle formed by a beam radiated from the steering array 1200 and the normal of the 2D plane of the steering array 1200 is referred to as an angle of diffraction $\theta$. The angle of diffraction $\theta$ is proportional to the wavelength $\lambda$ of light and a change $\Delta\phi$ in a phase of the light as illustrated in FIG. 3.

Figure 4A:
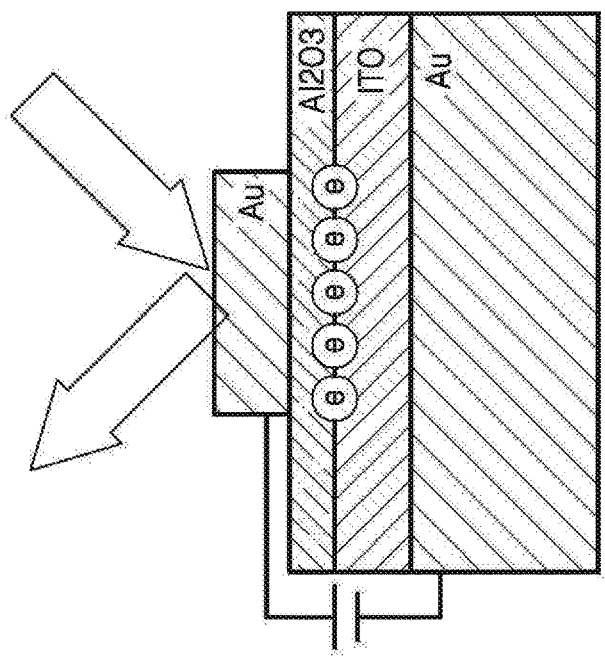
FIGS. 4A and 4B are diagrams illustrating structures and operations of elements of a steering array of a beam steering apparatus, according to an example embodiment.
Figure 4A:
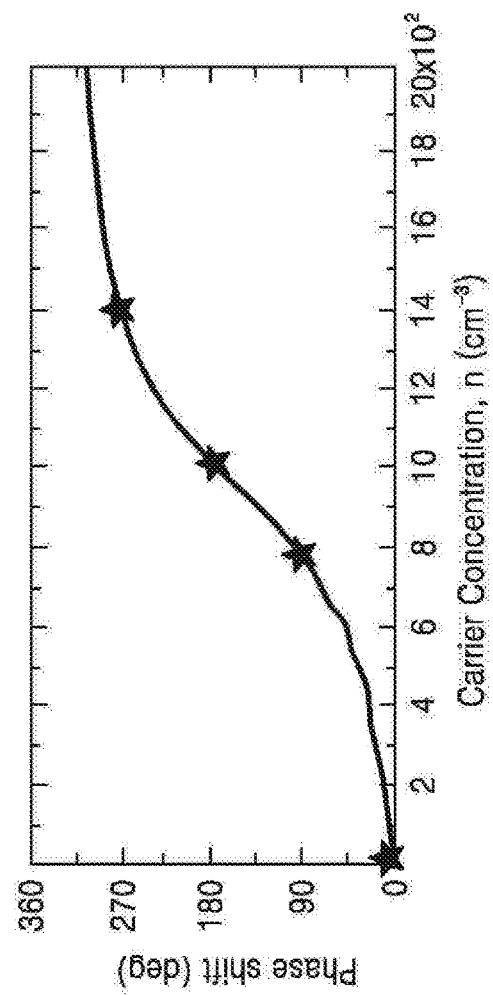
Figure 4B:
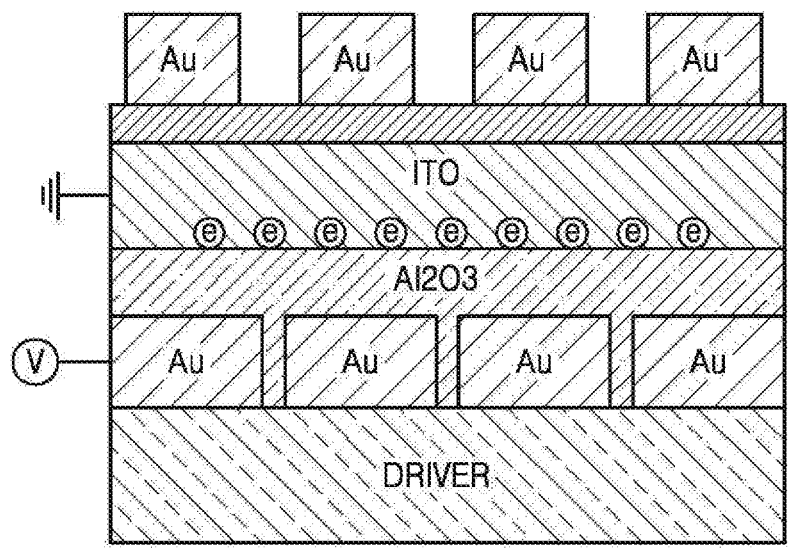

FIGS. 4A and 4B are diagrams illustrating structures and operations of elements of the steering array 1200 of the beam steering apparatus, according to an example embodiment.

As illustrated in FIGS. 4A and 4B, each element of the steering array 1200 may be a structure in which a conductive film and an oxide film are stacked between metal electrodes, e.g., of Au. The conductive film may include a material having high conductivity such as an indium tin oxide (ITO). The oxide film may include a material having high permittivity such as $Al_2O_3$.

An operation of each element of the steering array 1200 will be described below. A refractive index of each element of the steering array 1200 may vary according to a voltage applied thereto. Referring to FIGS. 4A and 4B, a change in a voltage applied to each element of the steering array 1200 may result in a change in the density or concentration of electric charges (e.g., "e") that are carriers in a conductive film included in each element of the steering array 1200. The change in the density of the electric charges may result in a change in the refractive index of the element, thereby causing a change or shift in a phase as illustrated in FIG. 4B. Based on this principle, the steering array 1200 may adjust a voltage to be applied to each element of the steering array 1200 to change an angle of diffraction of an incident beam and control a direction of the incident beam. In other words, the steering array 1200 may control a direction of a beam incident from a light source by using elements, the refractive indexes of which vary according to a voltage applied thereto.

A voltage to be applied to each element of the steering array 1200 may be generated within a short time, so that a direction of a beam may be controlled by controlling the voltage to be applied to each element. To more precisely control the direction of the beam, the number of elements to be included in a region of the steering array 1200 may be increased. As the number of elements of the steering array 1200 increases, voltages to be applied to the elements of the steering array 1200 may be generated within a shorter time. A driver that generates voltages to be respectively applied to the elements of the steering array 1200 at a high speed to drive the steering array 1200 at a high speed will be described in detail below. The voltages to be respectively applied to the elements of the steering array 1200 may be applied between an upper metal electrode and a lower metal electrode as illustrated in FIG. 4A or may be applied between a lower metal electrode and a conductive film as illustrated in FIG. 4B. Otherwise, the voltages to be respectively applied to the elements of the steering array 1200 may be applied between an upper metal electrode and a conductive film.

Figure 5:
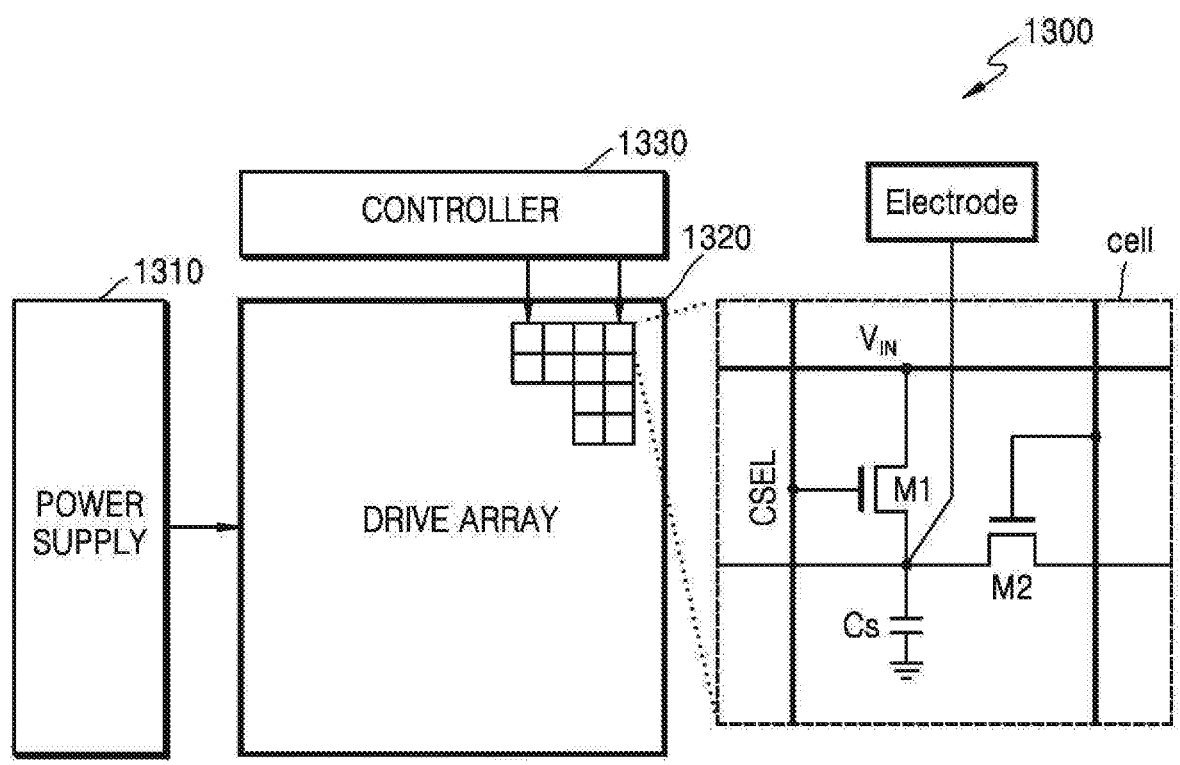
FIG. 5 is a diagram illustrating a structure of a driver of a beam steering apparatus and a structure of cells of a drive array, according to an example embodiment.

FIG. 5 is a diagram illustrating a structure of a driver 1300 of a beam steering apparatus and a structure of cells of a drive array 1320, according to an example embodiment.

The driver 1300 may include the drive array 1320 that includes a plurality of cells for generating voltages to be applied to the respective element of the steering array 1200 (all voltages to be applied to the respective elements of the steering array 1200 will be hereinafter referred to together as 'first voltages'); a power supply 1310 that applies, to the drive array 1320, voltages to be used to generate the first voltages (all voltages that are to be used to generate the first voltages and are applied from the power supply 1310 to the drive array 1320 will be hereinafter referred to together as 'second voltages'); and a controller 1330 that controls the drive array 1320. When the drive array 1320 is a 2D array, the power supply 1310 may apply the second voltages to an arbitrary line of the drive array 1320. FIG. 5 illustrates a case in which the power supply 1310 applies the second voltages to a line of the drive array 1320 in a column direction.

The driver 1300 may drive the steering array 1200, based on a method of generating a voltage corresponding to an intermediate value from at least two voltages.

The drive array 1320 may include the plurality of cells corresponding to the elements of the steering array 1200. The plurality of cells of the drive array 1320 may be respectively connected to the elements of the steering array 1200 and may drive the steering array 1220 by applying the first voltages stored in the cells of the drive array 1320 to the elements of the steering array 1200.

Each of the cells of the drive array 1320 may include a capacitor Cs that stores a first voltage or a second voltage $V_{IN}$, a first switch M1 that controls storing of the second voltage in the capacitor Cs, and a second switch M2 that controls a connection between the capacitor Cs of the cell and a capacitor of an adjacent cell. The capacitor Cs, the first switch M1, and the second M2 are connected at an electrode.

Figure 6:
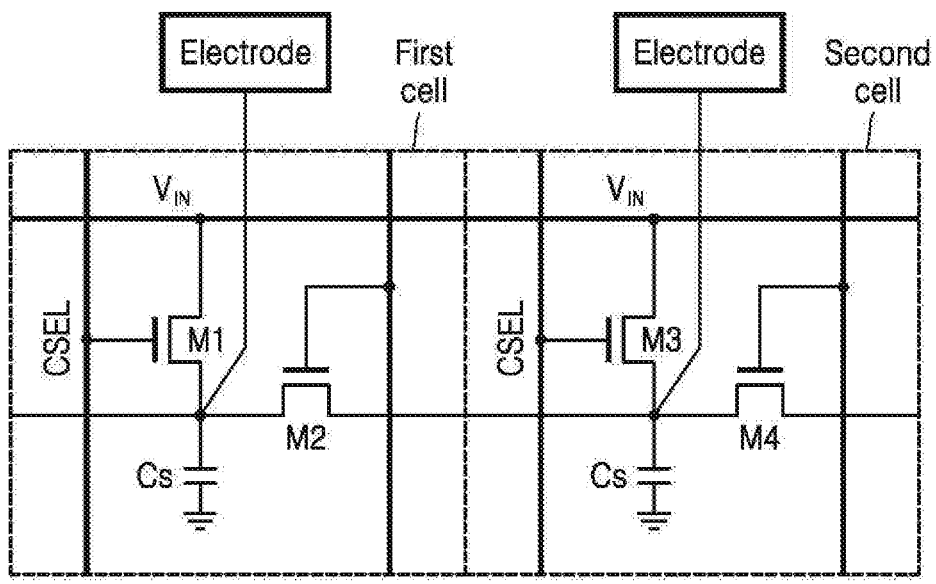
FIG. 6 is a diagram illustrating a structure and operation of cells of a drive array of a beam steering apparatus, according to an example embodiment.

FIG. 6 is a diagram illustrating a structure and operation of cells of a drive array of a beam steering apparatus, according to an example embodiment.

In FIG. 6, a first cell is an arbitrary cell included in a first column and a second cell is a cell that is included in a second column and located adjacent to the first cell. A process of respectively storing second voltages in two adjacent cells, generating a first voltage from the second voltages stored in the two adjacent cells, and storing the first voltage will be described below.

The controller 1330 of FIG. 5 may control the second voltages to be stored by controlling cells that are included in a line of the drive array 1320 of FIG. 5 in a first-column direction and to which the second voltages are applied. Referring to FIG. 6, a second voltage $V_{IN}$ is stored in a capacitor Cs of the first cell by supplying a signal CSEL to a first switch M1 of the first cell. Similarly, the controller 1330 may control the second voltage to be stored by controlling cells that are included in a line of the drive array 1320 in a second-column direction and to which the second voltages are applied. Referring to FIG. 6, a second voltage $V_{IN}$ is stored in a capacitor Cs of the second cell by supplying the signal CSEL to a first switch M3 of the second cell.

When second voltages $V_{IN}$ that are different voltages are respectively stored in the capacitor Cs of first cell and the capacitor Cs of the second cell, the controller 1330 may control a second switch M2 of the first cell, which connects the first cell to the second cell, to be off.

When the storing of the second voltages $V_{IN}$ in the capacitor Cs of the first cell and the capacitor Cs of the second cell is completed, the controller 1330 may control a second switch M2 of the first cell to be on. As a result, the capacitor Cs of the first cell and the capacitor Cs of the second cell are connected to each other, and a voltage corresponding to an intermediate value may be generated from the second voltages stored in the first and second cells, and stored in the capacitor Cs of the first cell and the capacitor Cs of the second cell.

That is, the drive array 1320 may generate first voltages from the second voltages stored in adjacent cells in the drive array 1320 in a row direction and store the first voltages in the adjacent cells, based on the method of generating a voltage corresponding to an intermediate value from at least two voltages. To this end, the controller 1330 may generate the first voltages by selectively operating the first switches M1 and M3 and second switches M2 and M4 of the first and second cells, respectively.

Figure 7A:
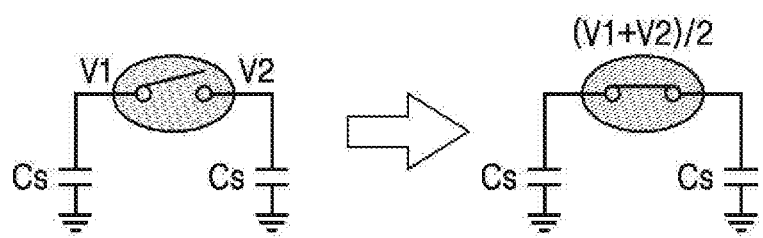
FIG. 7A is a diagram illustrating a voltage change principle when cells of a drive array of a beam steering apparatus are connected to each other, according to an example embodiment.

FIG. 7A is a diagram illustrating a voltage change principle when cells of a drive array of a beam steering apparatus are connected to each other, according to an example embodiment.

As illustrated in a left diagram of FIG. 7A, when a capacitor Cs of a first cell and a capacitor Cs of a second cell are not connected to each other, a second voltage stored in the capacitor Cs of the first cell is V1 and a second voltage stored in the capacitor Cs of the second cell is V2.

Thereafter, when the capacitor Cs of the first cell and the capacitor Cs of the second cell are connected to each other, a first voltage (V1+V2/2) corresponding to an intermediate value between the second voltage V1 stored in the capacitor Cs of the first cell and the second voltage V2 stored in the capacitor Cs of the second cell may be generated and stored in the capacitor Cs of the first cell and the capacitor Cs of the second cell as illustrated in a right diagram of FIG. 7A.

FIG. 7B is a diagram illustrating a voltage change process when cells of a drive array of a beam steering apparatus are connected to each other, according to an example embodiment.

FIG. 7B illustrates operations of a process of storing second voltages to super cells formed by connecting cells, which are perpendicular to an arbitrary line of the drive array 1320 to which the second voltages are applied, in units of predetermined units, and generating first voltages by controlling a connection between adjacent super cells and a connection between adjacent cells included in the super cells. In FIG. 7B, super cells are denoted by thick lines, and cells included in each of the super cells are denoted by broken lines.

In operation 1 (i.e., a sampling from a digital-to-analog converter (DAC)), each super cell is formed by connecting two cells and second voltages are applied to an arbitrary line of each super cell. Although the second voltages are applied to only cells belonging to the arbitrary line among the cells included in each super cell, all the cells included in each super cell have the same second voltage because the two cells of each super cell are connected. Referring to FIG. 7B, a second voltage V1 is applied to cells included in a first super cell and cells included in a second super cell, and a second voltage V2 is applied to cells included in a third super cell and cells included in a fourth super cell. In this case, the second super cell and the third super cell are disconnected from each other.

In operation 2 (i.e., mid-level generation), the first super cell and the second super cell are disconnected from each other, the second super cell and the third super cell are connected to each other, and the third super cell and the fourth super cell are disconnected from each other. According to the voltage change principle described above with reference to FIG. 7A, a voltage corresponding to an intermediate value is generated from the second voltages stored in the second super cell and the third super cell. Thus, all the cells included in the second and third super cells generate and store a voltage (V1+V2/2).

In operation 3 (i.e., quarter-level generation), the first to fourth super cells are connected to one another but the cells included in each of the first to fourth super cells are disconnected from each other. According to the voltage change principle described above with reference to FIG. 7A, a voltage corresponding to an intermediate value is generated from voltages stored in respective cells connected to each other. Thus, each cell generates and stores a voltage as illustrated in FIG. 7B.

It takes less time to apply second voltages to only an arbitrary column or row line included in each super cell by the power supply 1310 than to apply the second voltages to all column or row lines of the drive array 1320 by the power supply 1310. Thus, the beam steering apparatus 1000 may be driven at a high speed and a number of times that the second voltages are to be applied may be reduced to save power. For example, when every two cells are connected to form a super cell and second voltages are applied to only cells included in an arbitrary line of each super cell, a number of times that the power supply 1310 will apply the second voltages to the drive array 1320 may be reduced to half and a time used to apply the second voltages may be also reduced.

Figure 8:
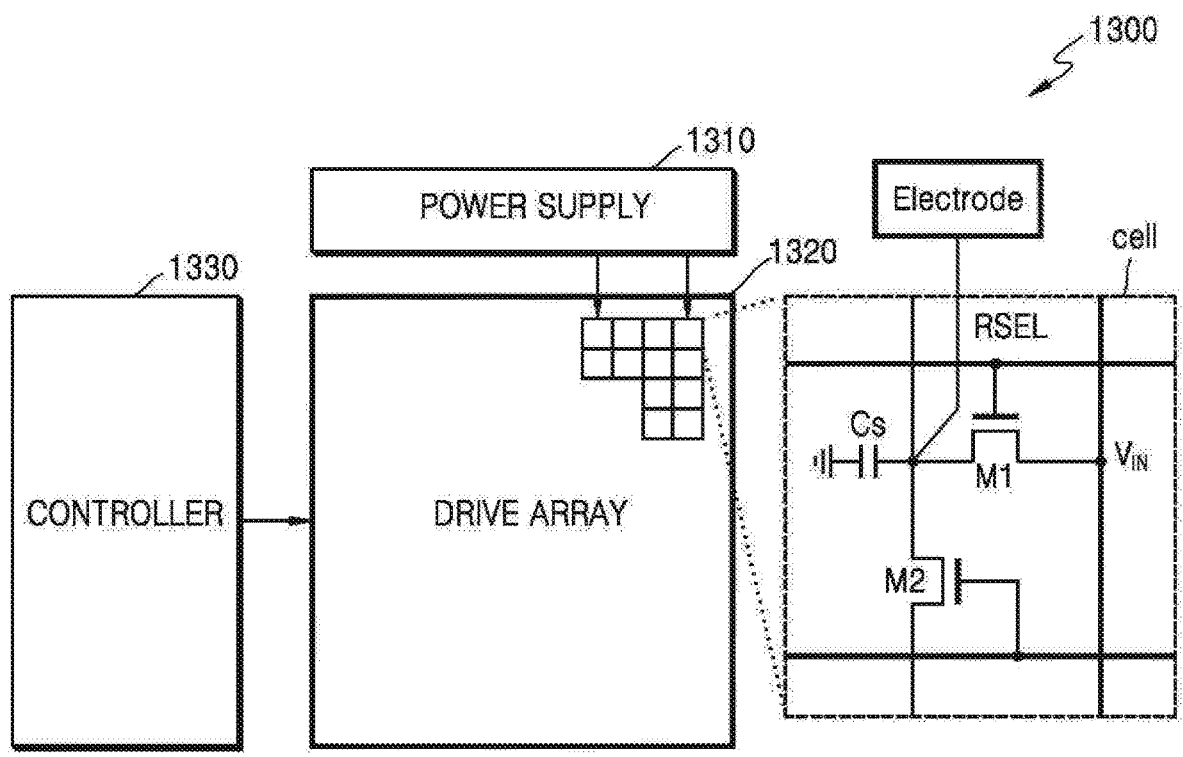
FIG. 8 is a diagram illustrating a structure of a driver of a beam steering apparatus and a structure of cells of a drive array, according to another example embodiment.

FIG. 8 is a diagram illustrating a structure of the driver 1300 of a beam steering apparatus and a structure of cells of the drive array 1320, according to another example embodiment.

The driver 1300 may include the drive array 1320 including a plurality of cells for generating first voltages to be applied to the elements of the steering array 1200 of FIG. 1; the power supply 1310 that applies second voltages, which are to be used to generate the first voltages, to the drive array 1320; and the controller 1330 that controls the drive array 1320. When the drive array 1320 is a 2D array, the power supply 1310 may apply second voltages to an arbitrary line of the drive array 1320. FIG. 8 illustrates a case in which the power supply 1310 applies second voltages to a line of the drive array 1320 in a row direction.

The driver 1300 may drive the steering array 1200, based on the method of generating a voltage corresponding to an intermediate value from at least two voltages.

The drive array 1320 may include the plurality of cells corresponding to the elements of the steering array 1200. The plurality of cells of the drive array 1320 is respectively connected to the elements of the steering array 1200. The steering array 1200 may be driven by applying the first voltages stored in the plurality of cells of the drive array 1320 to the elements of the steering array 1200.

Each of the plurality of cells of the drive array 1320 may include a capacitor Cs for storing the first or second voltage, a first switch M1 for controlling storing of the second voltage in the capacitor Cs, and a second switch M2 for controlling a connection between the capacitor Cs of the cell and a capacitor of an adjacent cell. The capacitor Cs, the first switch M1, and the second M2 are connected at an electrode.

Figure 9:
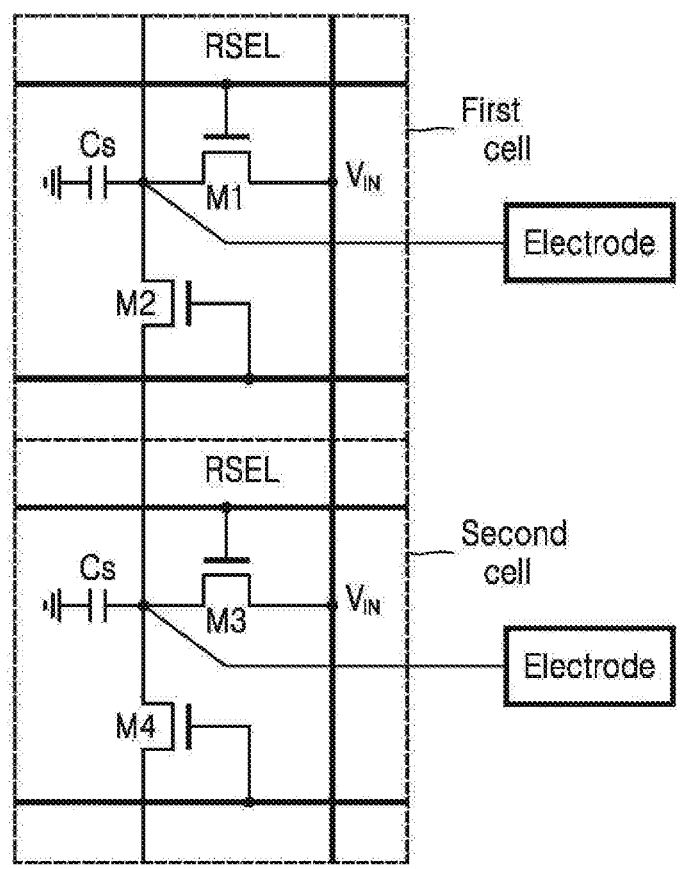
FIG. 9 is a diagram illustrating a structure and operation of cells of a drive array of a beam steering apparatus, according to another example embodiment.

FIG. 9 is a diagram illustrating a structure and operation of cells of a drive array of a beam steering apparatus, according to another example embodiment.

In FIG. 9, a first cell is an arbitrary cell included in a first row, and a second cell is a cell included in a second row and located adjacent to the first cell. A process of respectively storing second voltages in two adjacent cells, generating a first voltage from the second voltages stored in the two adjacent cells, and storing the first voltage will be described below.

The controller 1330 of FIG. 8 may control second voltages to be stored by controlling cells to which the second voltages are applied and that are included in a line of the drive array 1320 in a first-row direction. Referring to FIG. 9, a second voltage $V_{IN}$ may be stored in a capacitor Cs of the first cell by supplying a signal RSEL to a first switch M1 of the first cell. Similarly, the controller 1330 control second voltages to be stored by controlling cells to which the second voltages are applied and that are included in a line of the drive array 1320 in a second-row direction. Referring to FIG. 9, a second voltage $V_{IN}$ is stored in a capacitor Cs of the second cell by supplying the signal RSEFL to a first switch M3 of the second cell.

When second voltages $V_{IN}$ that are different voltages are stored in the capacitor Cs of the first cell and the capacitor Cs of the second cell, the controller 1330 may control a second switch M2 of the first cell, which connects the first cell to the second cell, to be off.

When the storing of the second voltages $V_{IN}$ in the capacitor Cs of the first cell and the capacitor Cs of the second cell is completed, the controller 1330 may control the second switch M2 of the first cell to be on. As a result, the capacitor Cs of the first cell and the capacitor Cs of the second cell may be connected to each other, and a voltage corresponding to an intermediate value may be generated from the second voltages stored in the first and second cells and stored in the capacitor Cs of the first cell and the capacitor Cs of the second cell.

That is, the drive array 1320 may generate first voltages from second voltages stored in adjacent cells included in the drive array 1320 in a column direction and store the first voltages in the adjacent cells according to the method of generating a voltage corresponding to an intermediate value from at least two voltages. To this end, the controller 1330 may generate a first voltage by selectively operating first switches M1 and M3 and second switches M2 and M4 of the first and second cells, respectively.

Figure 10:
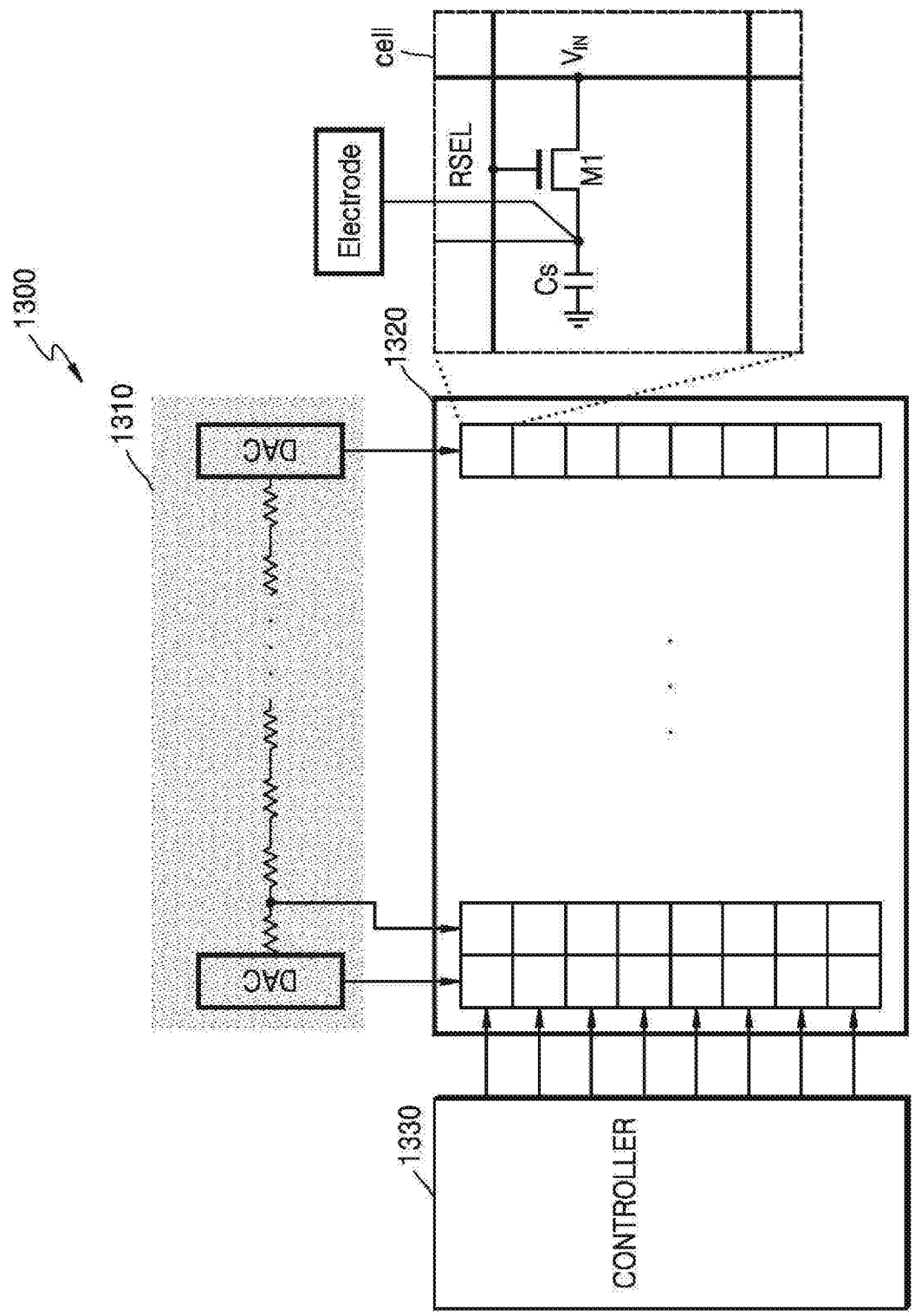
FIG. 10 is a diagram illustrating a structure of a driver of a beam steering apparatus and an operation of a power supply, according to another example embodiment.

FIG. 10 is a diagram illustrating a structure of the driver 1300 of a beam steering apparatus and an operation of the power supply 1310, according to another example embodiment.

The driver 1300 may include the drive array 1320 including a plurality of cells for generating first voltages to be respectively applied to the elements of the steering array 1200 of FIG. 1; the power supply 1310 that applies second voltages, which are to be used to generate the first voltages, to the drive array 1320; and the controller 1330 that controls the drive array 1320. When the drive array 1320 is a 2D array, the power supply 1310 may apply the second voltages to an arbitrary line of the drive array 1320. FIG. 10 illustrates a case in which the power supply 1310 applies the second voltages to a line of the drive array 1320 in a row direction.

The drive array 1320 may include the plurality of cells corresponding to the elements of the steering array 1200. The plurality of cells of the drive array 1320 is respectively connected to the elements of the steering array 1200. The steering array may be driven by respectively applying the first voltages stored in the plurality of cells of the drive array 1320 to the elements of the steering array 1200.

Each of the plurality of cells of the drive array 1320 may include a capacitor Cs that stores a voltage, and a first switch M1 that controls storing of a second voltage in the capacitor Cs. In this case, first voltages to be applied to the elements of the steering array 1200 may be generated from second voltages applied to the plurality of cells of the drive array 1320 from the power supply 1310. The capacitor Cs and the first switch M1 are connected at an electrode.

The power supply 1310 may generate second voltages from predetermined initial voltages and apply the second voltages to the drive array 1320 according to the method of generating a voltage corresponding to an intermediate value from at least two voltages, based on the number of cells that are included in an arbitrary line of the drive array 1320 to which the second voltages are applied. The generating and applying of the second voltages is based on the characteristics of the second voltages output from the power supply 1310 of the beam steering apparatus.

Figure 11:
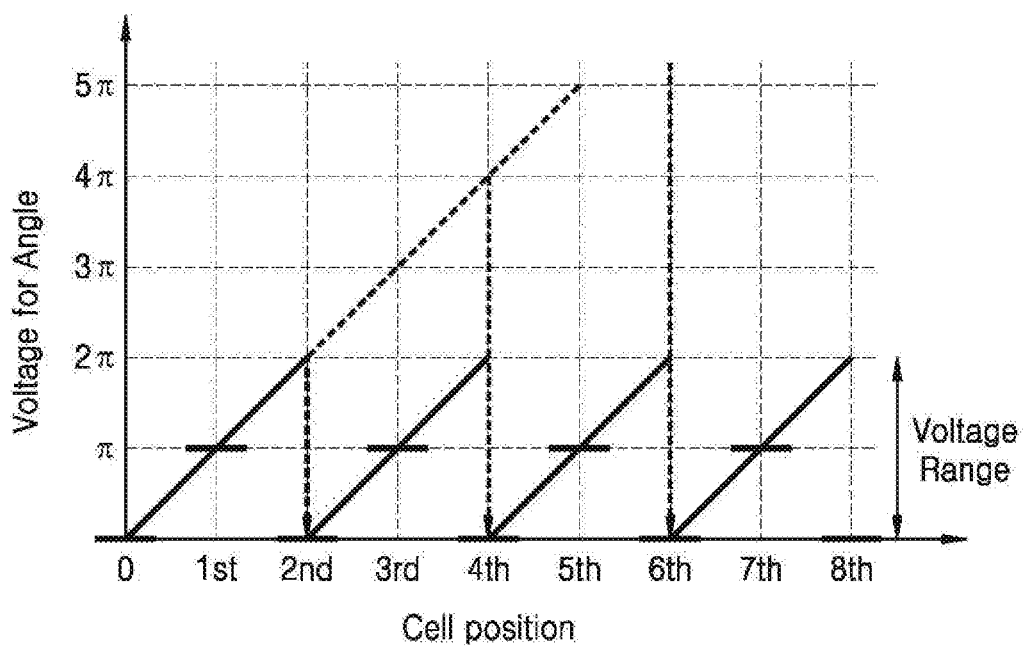
FIG. 11 is a graph showing voltages output from a power supply of a beam steering apparatus according to another example embodiment.

FIG. 11 is a graph showing voltages output from a power supply of a beam steering apparatus, according to another example embodiment.

Voltages having a pattern may be applied to all cells of the drive array 1320, so that the beam steering apparatus 1000 may control a direction of a beam to be steered by a predetermined angle. As illustrated in FIG. 11, second voltages, which are to be applied to an arbitrary line of the drive array 1320, may have a repetitive pattern of monotonously increasing or decreasing in a section in a direction of the arbitrary line. The structure and operation of the power supply 1310 that generates second voltages at a high speed in consideration of the characteristics of the second voltages that monotonously increases or decrease with a regular voltage difference will be described below.

Figure 12:
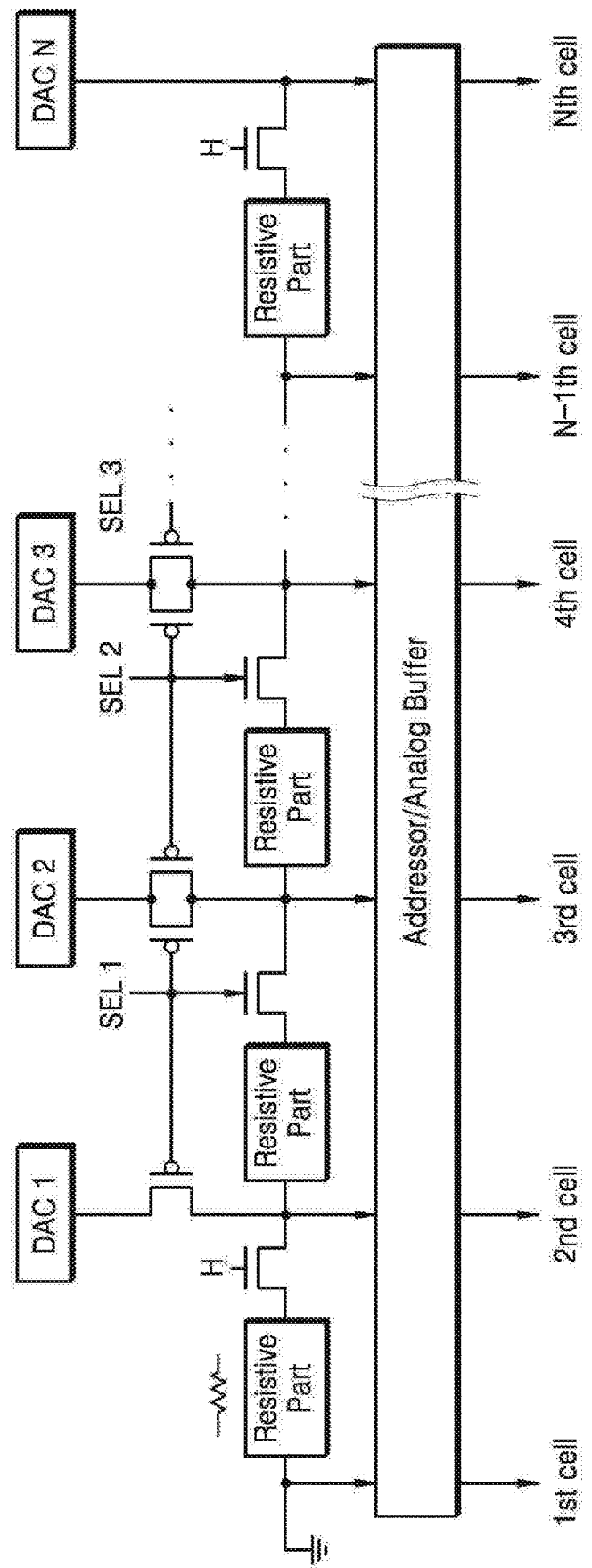
FIG. 12 is a diagram illustrating a structure and operation of a power supply of a beam steering apparatus, according to another example embodiment.

FIG. 12 is a diagram illustrating a structure and operation of the power supply 1310 of a beam steering apparatus, according to another example embodiment.

The power supply 1310 may generate second voltages corresponding to the number of cells included in an arbitrary line of the drive array 1320 of FIG. 1 and apply the second voltages to the drive array 1320 according to the method of generating a voltage corresponding to an intermediate value from predetermined initial voltages.

To this end, the power supply 1310 may include a plurality of initial voltage generators, a plurality of resistive parts, and a plurality of switches as illustrated in FIG. 12. Each of the plurality of initial voltage generators may include a DAC and a switch for controlling an output of the DAC. Any one or any combination of predetermined initial voltages may be set using any one or any combination of the plurality of initial voltage generators. The plurality of resistive parts may correspond to cells included in an arbitrary line of the drive array 1320. Not only resistors as illustrated in FIG. 12 but also various devices that may be embodied as resistors may be referred to collectively as the plurality of resistive parts. The plurality of switches may be respectively connected to the plurality of resistive parts to drive the plurality of resistive parts. The switch included in each of the plurality of initial voltage generators and a switch of each of the plurality of switches that drive the plurality of resistive parts may be designed to operate in opposite ways according to one control signal, and may be respectively embodied as an NMOS and a PMOS as illustrated in FIG. 12.

The power supply 1310 may generate second voltages by selectively operating the plurality of switches and the plurality of initial voltage generators. An operation of the power supply 1310 according to the shape of a second voltage output from the power supply 1310 will be described with reference to FIGS. 13 and 14 below.

Figure 13:
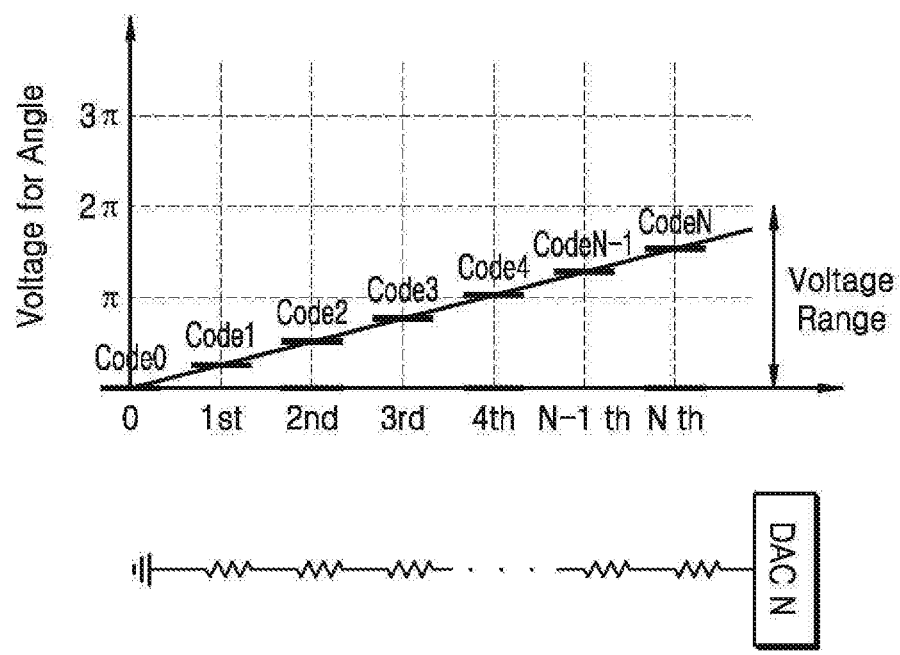
FIG. 13 is a diagram showing an equivalent circuit of a power supply of a beam steering apparatus when a phase of a voltage output from the power supply does not exceed $2\pi$, according to another example embodiment.

FIG. 13 is a diagram showing an equivalent circuit of a power supply of a beam steering apparatus when a phase of a voltage output from the power supply does not exceed $2\pi$, according to another example embodiment.

When the phase of a voltage of each of cells of the drive array 1320 does not exceed $2\pi$, an initial voltage is set by controlling only a voltage of an $N^{th}$ DAC that is a last terminal of the power supply 1310 of FIG. 12 to be output, and all signals SEL are set to be logic high. Then, second voltages to be applied to the cells of the drive array 1320 are generated to have equally-spaced electric charges, similar to a result of dividing the voltage of the $N^{th}$ DAC that is the last terminal by the plurality of resistive parts of FIG. 12. As illustrated in FIG. 13, the power supply 1310 may generate a second voltage that increases by a voltage difference from a first cell to an $N^{th}$ cell.

Figure 14:
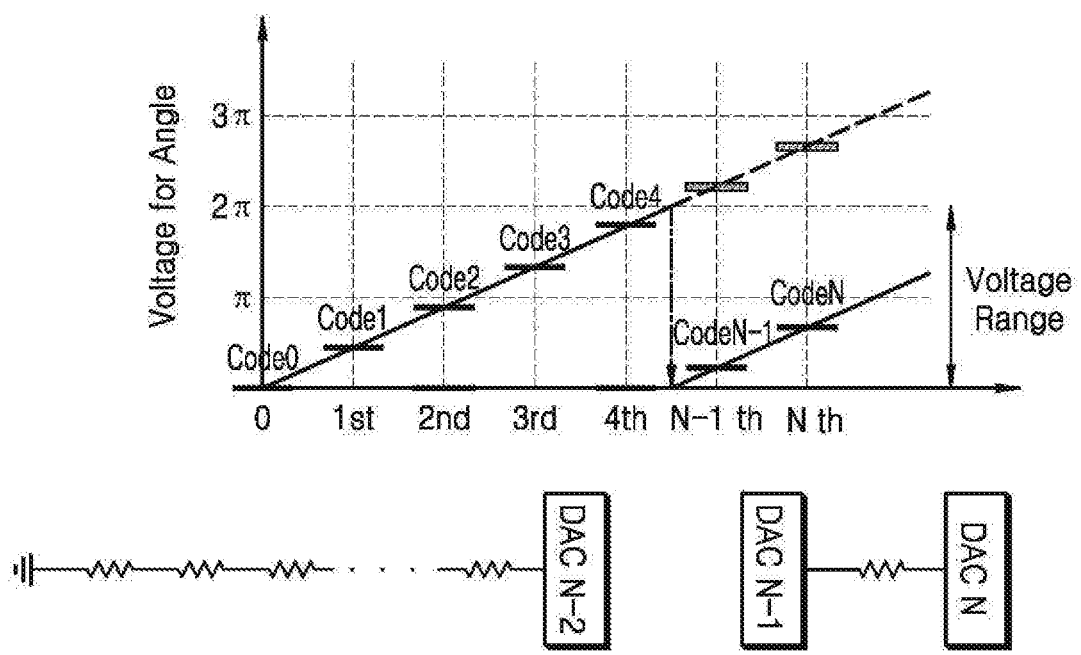
FIG. 14 is a diagram showing an equivalent circuit of a power supply of a beam steering apparatus when a phase of a voltage output from the power supply exceeds $2\pi$, according to another example embodiment.

FIG. 14 is a diagram showing an equivalent circuit of a power supply of a beam steering apparatus when a phase of a voltage output from the power supply exceeds $2\pi$, according to another example embodiment.

A voltage, of which phase exceeds $2\pi$, among voltages applied to the cells of the drive array 1320 has the same phase as a voltage subtracted a voltage of which phase is $2\pi$ from the voltage of which phase exceeds $2\pi$. Thus the voltage of which phase exceeds $2\pi$ increases to have equally-spaced electric charges, starting from a new voltage as illustrated in FIG. 14. In this case, two power supply circuits may be formed as illustrated in FIG. 14 by setting an input of a switch connected to a resistive part corresponding to the portion of the driving array 1320 having the phase of more than $2\pi$ to be low signal. In this case, when a total of three DAC voltages are output and set as initial voltages, second voltages are generated from the initial voltages. When a number of times that phases of voltages of the cells of the drive array 1320 exceed $2\pi$ is M or more, second voltages may be generated at a high speed by outputting (2M+1) DAC voltages based on a pattern of generating equally-spaced voltages as described above. Because the second voltages may be generated without driving all DACs, the beam steering apparatus may be driven with low power consumption.

Figure 15:
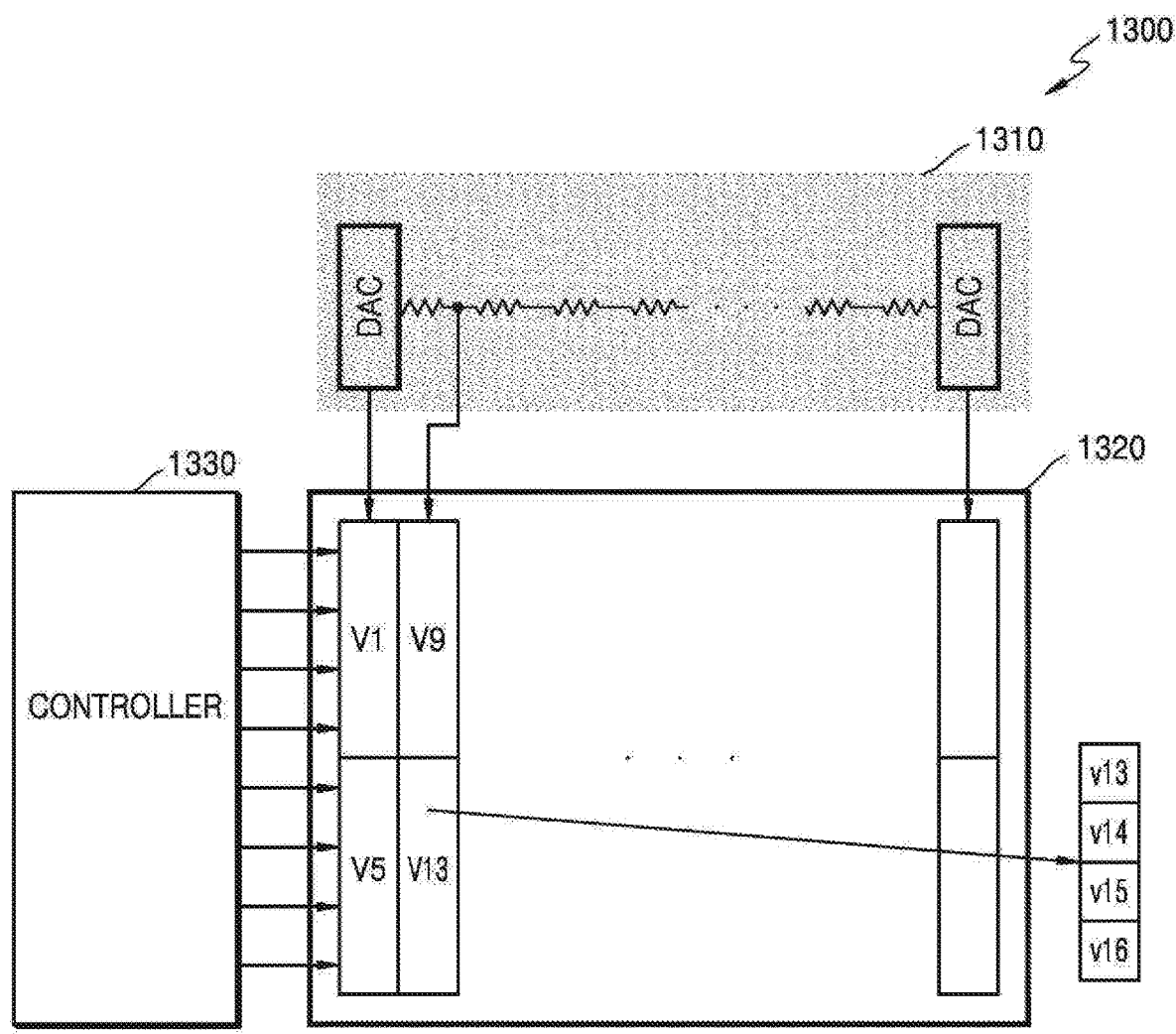
FIG. 15 is a diagram illustrating a structure and operation of a driver of a beam steering apparatus, according to another example embodiment.

FIG. 15 is a diagram illustrating a structure and operation of the driver 1300 of a beam steering apparatus, according to another example embodiment.

The driver of FIG. 15 may include the power supply 1310, the drive array 1320, and the controller 1330, and is an example embodiment using both of the drive array 1320 described above with reference to FIGS. 5 to 9 and the power supply 1310 described above with reference to FIGS. 10 to 14.

The power supply 1310 may generate second voltages from predetermined initial voltages and apply the second voltages to the drive array 1320 according to the method of generating a voltage corresponding to an intermediate value from at least two voltages, based on the number of cells that are included in an arbitrary line of the drive array 1320 and to which second voltages are applied. Thus, the power supply 1310 may generate second voltages having a constantly increasing or decreasing pattern at a high speed.

The drive array 1320 may generate first voltages from second voltages stored in adjacent cells included therein according to the method of generating a voltage corresponding to an intermediate value from an at least two voltages, and respectively store the first voltages in the adjacent cells thereof. In the drive array 1320, second voltages are applied to super cells formed by connecting cells constituting the drive array 1320 in units of predetermined units, and first voltages may be generated at a high speed by controlling a connection between adjacent super cells and a connection between adjacent cells included in the super cells when the second voltages are stored in all the super cells. Referring to FIG. 15, every four cells are connected to form a super cell, and second voltages V1, V5, V9, and V13 are applied and stored in super cells. Thereafter, cells included in each of the super cells may respectively have first voltages by controlling a connection between adjacent super cells and a connection between adjacent cells included in the super cells. For example, first voltages v13, v14, v15, and v16 may be respectively stored in the cells included in the super cell to which the second voltage V13 is applied.

Figure 16:
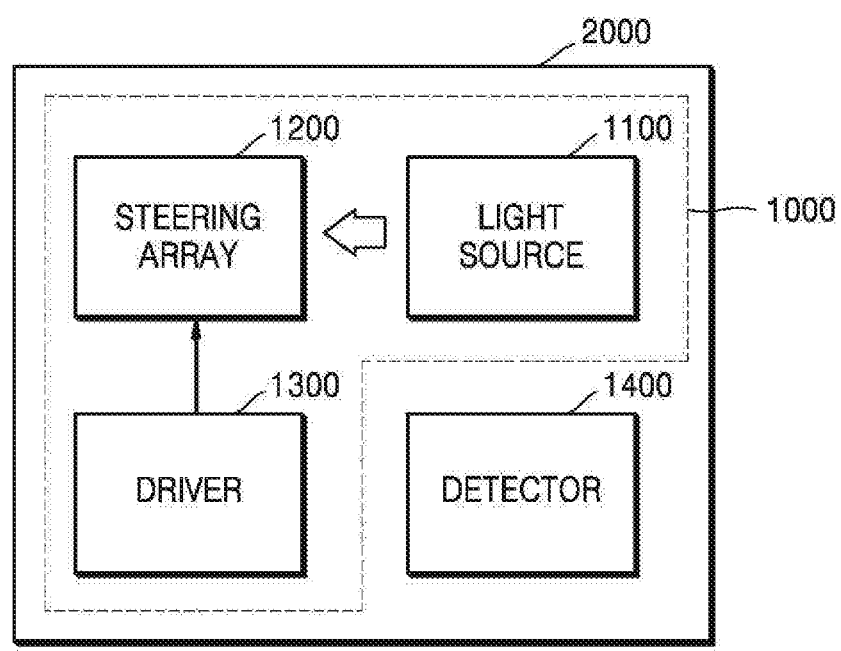
FIG. 16 is a block diagram of a spatial information acquisition apparatus according to an example embodiment.

FIG. 16 is a block diagram of a spatial information acquisition apparatus 2000 according to an example embodiment.

The spatial information acquisition apparatus 2000 may include the beam steering apparatus 1000 described above, and a detector 1400 that detects information regarding a space into which a beam is reflected from the beam steering apparatus 1000 on the basis of information received when the beam is reflected.

The beam steering apparatus 1000 of the spatial information acquisition apparatus 2000 may generate a driving voltage on the basis of the method of generating a voltage corresponding to an intermediate value from at least two voltages, and control a direction of a beam incident from a light source by using elements, the refractive indexes of which vary according to the generated driving voltage. The beam steering apparatus 1000 may include the light source 1100, the steering array 1200, and the driver 1300.

The detector 1400 of the spatial information acquisition apparatus 2000 may include an image sensor or a photo detector array.

Figure 17:
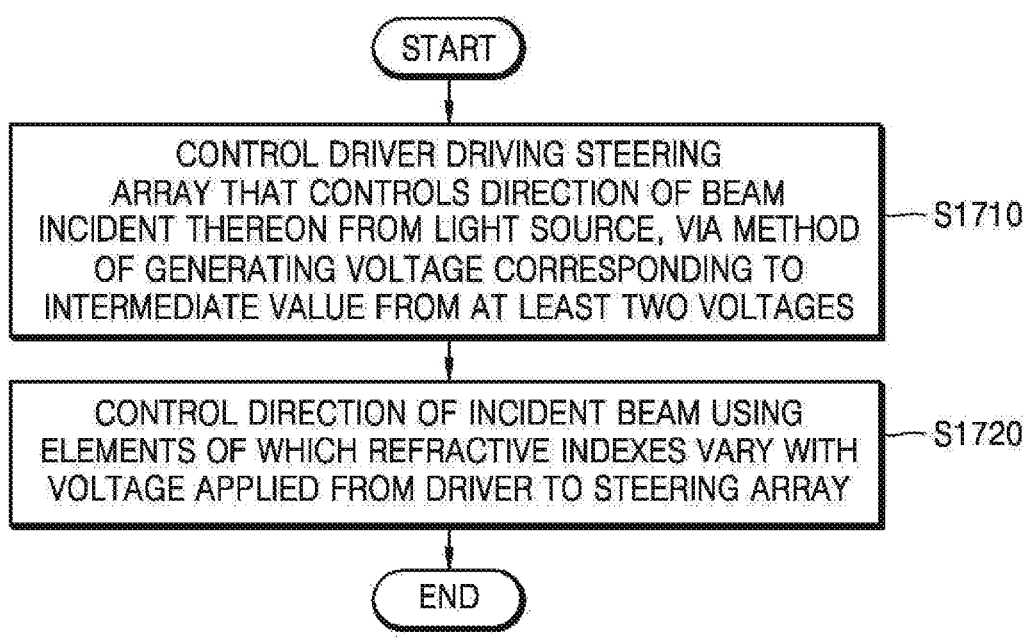
FIG. 17 is a flowchart of a method of driving a beam steering apparatus, according to an example embodiment.

FIG. 17 is a flowchart of a method of driving a beam steering apparatus, according to an example embodiment.

In operation 1710, the beam steering apparatus 1000 controls the driver 1300 driving the steering array 1200 that controls a direction of a beam incident thereon from a light source, via the method of generating a voltage corresponding to an intermediate value from at least two voltages.

The beam steering apparatus 1000 may apply second voltages, which are to be used to generate first voltages, to the drive array 1320 including cells for storing first voltages to be applied to the elements of the steering array 1200. The beam steering apparatus 1000 may generate the first voltages from the second voltages and store the first voltages. In this case, at least one selected from the group consisting of the first voltages and the second voltages may be generated according to the method of generating a voltage corresponding to an intermediate value from at least two voltages.

The beam steering apparatus 1000 may generate second voltages from predetermined initial voltages and apply the second voltages to the drive array 1320 according to the method of generating a voltage corresponding to an intermediate value from at least two voltages, based on the number of cells included in an arbitrary line of the drive array 1320 and to which second voltages are applied. The second voltages applied to the arbitrary line of the drive array 1320 may have a pattern of monotonously increasing or decreasing in a direction of the arbitrary line. The beam steering apparatus 1000 may generate second voltages and apply the second voltages to the drive array 1320 by selectively operating a plurality of switches connected to a plurality of initial voltage generators that set at least one among predetermined initial voltages and a plurality of resistive parts corresponding to cells included in an arbitrary line of the drive array 1320 to drive the plurality of resistive parts.

The beam steering apparatus 1000 may generate first voltages from the second voltages stored in adjacent cells included in the drive array 1320 according to the method of generating a voltage corresponding to an intermediate value from at least two voltages, and respectively store the first voltages in the adjacent cells. The beam steering apparatus 1000 may generate and store first voltages in the drive array 1320 by storing second voltages in super cells formed by connecting, in units of predetermined units, cells that are perpendicular to an arbitrary line of the drive array 1320 to which second voltages are applied and controlling a connection between adjacent super cells and a connection between adjacent cells included in super cells, according to the method of generating a voltage corresponding to an intermediate value from two voltages. The beam steering apparatus 1000 may generate a first voltage by selectively operating a first switch that controls a second voltage to be stored in a capacitor configured to store a second or first voltage and a second switch that controls a connection between the capacitor and a capacitor of an adjacent cell.

The beam steering apparatus 1000 may generate second voltages from predetermined initial voltages, store the second voltages, generate first voltages to be applied to the elements of the steering array 1200 from the second voltages, and store the first voltages, according to the method of generating a voltage corresponding to an intermediate value from two voltages.

In operation 1720, the beam steering apparatus 1000 controls a direction of an incident beam, using elements of which the refractive indexes vary with a voltage applied from the driver 1300 to the steering array 1200.

The above method of driving a beam steering apparatus may be embodied as a computer program. The computer program may be stored in a computer-readable recording medium, and executed using a general-purpose digital computer. Examples of the computer-readable medium include a magnetic recording medium (a ROM, a floppy disc, a hard disc, etc.), and an optical recording medium (a CD-ROM, a DVD, etc.).

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A beam steering apparatus comprising:
   a light source;
   a steering array comprising elements having refractive indexes varying with a voltage driving the steering array, the elements being configured to control a direction of a beam from the light source and incident on the steering array; and
   a driver comprising:
     a drive array configured to generate first voltages that are applied respectively to the elements of the steering array to drive the steering array, based on second voltages; and
     a power supply configured to:
       generate the second voltages, based on an intermediate value of predetermined initial voltages, and based on a number of cells that are included in a line of the drive array and to which the second voltages are applied; and apply the generated second voltages to be used to generate the first voltages, to the drive array.

2. The beam steering apparatus of claim 1, wherein the drive array comprises cells configured to store the first voltages that are applied to the respective elements of the steering array, and the beam steering apparatus further comprises a controller configured to control the drive array.

3. The beam steering apparatus of claim 1, wherein the second voltages applied to the line of the drive array have a pattern constantly increasing or decreasing in a direction of the line.

4. The beam steering apparatus of claim 1, wherein the power supply comprises:

initial voltage generators configured to set any one or any combination of the predetermined initial voltages;

resistive parts corresponding to the cells included in the line of the drive array; and switches respectively connected to the resistive parts and configured to drive the resistive parts, wherein the power supply is further configured to generate the second voltages by selectively operating the switches and the initial voltage generators.

5. The beam steering apparatus of claim 2, wherein the drive array is further configured to:

generate the first voltages, based on an intermediate value of the second voltages that are stored in adjacent cells included in the drive array; and store the generated first voltages in the adjacent cells.

6. The beam steering apparatus of claim 5, wherein the drive array is further configured to store the second voltages in super cells that are formed by connecting, in predetermined units, cells that are perpendicular to the line of the drive array and to which the second voltages are applied, and the controller is further configured to store the generated first voltages in the drive array by controlling a connection between adjacent super cells among the super cells and a connection between adjacent cells included in the super cells.

7. The beam steering apparatus of claim 5, wherein each of the cells comprises:

a capacitor configured to store one of the second voltages or the first voltages;

a first switch configured to control one of the second voltages to be stored in the capacitor; and a second switch configured to control a connection between an adjacent capacitor of an adjacent cell included in the drive array and the capacitor, wherein the controller is further configured to generate one of the first voltages by selectively operating the first switch and the second switch.

8. The beam steering apparatus of claim 5, wherein the controller is further configured to control the applying of the generated second voltages, the generating of the first voltages, the storing of the generated first voltages, and the driving of the steering array.

9. A method of driving a beam steering apparatus, the method comprising:

generating first voltages that are applied respectively to elements of a steering array to drive the steering array, based on second voltages, the elements having refractive indexes varying with a voltage driving the steering array;

generating the second voltages, based on an intermediate value of predetermined initial voltages, and based on a number of cells that are included in a line of a drive array and to which the second voltages are applied;

applying the generated second voltages to be used to generate the first voltages, to the drive an array; and controlling a direction of a beam from a light source and incident on the steering array, by the elements of the steering array.

10. The method of claim 9, further comprising storing the first voltages in cells of the drive array.

11. The method of claim 9, wherein the second voltages applied to the line of the drive array have a pattern constantly increasing or decreasing in a direction of the line.

12. The method of claim 9, wherein the generating of the second voltages comprises generating the second voltages by selectively operating switches and initial voltage generators, wherein the switches are respectively connected to resistive parts corresponding to the cells included in the line of the drive array, the switches driving the resistive parts, and the initial voltage generators set any one or any combination of the predetermined initial voltages.

13. The method of claim 10, wherein the generating of the first voltages comprises generating the first voltages, based on an intermediate value of the second voltages that are stored in adjacent cells included in the drive array, and the storing of the first voltages comprises storing the generated first voltages in the adjacent cells.

14. The method of claim 13, wherein the generating and storing of the first voltages comprises:

storing the second voltages in super cells that are formed by connecting, in predetermined units, cells that are perpendicular to the line of the drive array and to which the second voltages are applied; and storing the generated first voltages in the drive array by controlling a connection between adjacent super cells among the super cells and a connection between adjacent cells included in the super cells.

15. The method of claim 13, wherein the generating of the first voltages comprises generating one of the first voltages by selectively operating a first switch and a second switch of one of the cells, the first switch controls one of the second voltages to be stored in a capacitor of one of the cells, and the second switch controls a connection between an adjacent capacitor of an adjacent cell included in the drive array and the capacitor.

16. A spatial information acquisition apparatus comprising:

a beam steering apparatus configured to:

generate first voltages that are applied respectively to elements of a steering array to drive the steering array, based on an intermediate value of second voltages that are stored in adjacent cells included in a drive array, the elements having refractive indexes varying with a voltage driving the steering array;

generate and apply second voltages to be used to generate the first voltages, to the drive array; and control a direction of a beam from a light source and incident on the elements of the steering array; and a detector configured to detect information of a space into which the beam is reflected from the steering array, based on information that is received when the beam is reflected.

17. A method of a spatial information acquisition apparatus, the method comprising:

generating first voltages that are applied respectively to elements of a steering array to drive the steering array, based on an intermediate value of second voltages that are stored in adjacent cells included in a drive array, the elements having refractive indexes varying with a voltage driving the steering array;

generating and applying second voltages to be used to generate the first voltages, to the drive array;

controlling a direction of a beam from a light source and incident on the elements of the steering array; and detecting information of a space into which the beam is reflected from the steering array, based on information that is received when the beam is reflected.

\* \* \* \* \*